United States Patent Office 3,836,673
Patented Sept. 17, 1974

3,836,673
SINTERED SILICON CARBIDE
Gerald Q. Weaver, Worcester, and Bradford A. Olson, Leicester, Mass., assignors to Norton Company, Worcester, Mass.
No Drawing. Filed Mar. 23, 1972, Ser. No. 237,545
Int. Cl. C01b 31/36
U.S. Cl. 423—345          1 Claim

ABSTRACT OF THE DISCLOSURE

A dense silicon carbide product is described. The product has a flexural strength above 100,000 p.s.i. at room temperature, above 80,000 p.s.i. at 1200° C., above 60,000 p.s.i. at 1375° C. and above 45,000 p.s.i. at 1500° C. The product has a grain size of less than 5 microns and essentially all of the silicon carbide is in the alpha form. The product has a density in excess of 99% of theoretical density and contains about .5% to 5% aluminum. A preferred process for preparing the product is also described.

BACKGROUND OF THE INVENTION

There has long been a need for hard, strong materials which can operate under high stress at elevated temperatures without undergoing degradation and oxidation. Such materials preferably should also have high flexural strength at room temperature as well as at high temperature. In the past, some efforts have been made to produce such materials by forming products of silicon carbide. One product comprising "resolidified" silicon carbide is described in Hall Pat. 3,158,442 as being made by hot pressing silicon carbide at a temperature above 3500° C. and a pressure above 10,000 p.s.i. The flexural strength of this material is unknown but it apparently never reached the market place. One of the more publicized efforts to produce high strength silicon carbide has been the "KT" silicon carbide produced by the Carborundum Company (see "Materials and Methods" October 1956, page 92; "Journal of Material Science," Vol. 6, 1971, pages 324–331). This material is "selfbonded" silicon carbide which has some interesting properties but is not very strong, having a flexural strength less than 50,000 p.s.i. at room temperature. An improved form of silicon carbide which was produced by chemical vapor disposition (CVD) has been described by Gulden ("Journal of American Ceramic Society," Vol. 52, #11, pages 585–590, November 1969). This latter material, which is generally prepared by thermal decomposition of a silane, such as methyltrichlorosilane, has interesting physical properties. Its flexural strength is comparable to that produced by the present invention but it has the disadvantage that it cannot be prepared readily in large shapes. It is extremely difficult to form in the shape of balls, turbine blades and the like. Additionally, the product of the present invention has a randomly oriented grain structure while the CVD product is highly oriented in one direction. Another material recently announced by Ceradyne, Inc. is made by an unknown process and has a flexural strength approaching 50,000 p.s.i. A hot pressed material produced by Alfred Ceramic Enterprises is reported to have properties similar to the Ceradyne material.

PRIOR ART

The Prior Art most nearly applicable to the present invention (other than the above-mentioned materials) is derived primarily from some early work by Alliegro, Coffin and Tinklepaugh (J. Am. Ceram. Soc. 39 (11) 386–389, 1956) who produced a fairly dense (98%) hot pressed silicon carbide having a flexural strength on the order of 54,000 pounds per square inch at room temperature. Some recent work by General Electric Company (as described in the Progress Reports prepared for the Department of the Navy under Contract N00019-71-C-0290) is a further extension of the work of Alliegro et al. and involved the addition of boron to various silicon carbide powders with hot pressing to provide products having physical properties comparable to those of Alliegro et al. A recently issued patent to Du Pont, #3,520,656, July 14, 1970, Meadows & Yates, describes (example 34) a product formed from 96 volume percent beta silicon carbide and 4 volume percent alumina. This mixture is hot pressed to form a product having a density of 98% theoretical, about 50% alpha silicon carbide and about 50% beta silicon carbide with interposed crystals of alumina. The flexural strength of this material is 94,000 p.s.i. at room temperature. This Du Pont product has never been commercialized. Another remotely relevant patent is #3,178,807 to Bergmann (Du Pont) which described the explosive compaction of a SiC skeleton with impregnation with aluminum.

BRIEF SUMMARY OF INVENTION

The present invention is predominantly concerned with the production of a very dense, strong body of silicon carbide which, in a preferred embodiment, is prepared by hot pressing an intimate mixture of fine alpha silicon carbide grain and .5% to 5% of fine aluminum powder. This mixture is preferably prepared in a ball mill lined with tungsten carbide containing tungsten carbide balls by milling for a period of at least 15 hours of provide an exceedingly intimate dispersion of the aluminum powder throughout the alpha silicon carbide powder. The alpha silicon carbide powder preferably has a grain size on the order of 1–5 microns and is of a purity on the order of at least 99%. The mixing, which preferably takes place in an inert medium, such as isopropanol, should be carried on for at least 15 hours. The strength of the final pressed product is almost directly proportional to the time of milling in the range between 1 and 60 hours. The finely milled product is then dried by filtration and heating to 90° C. to drive off the remainder of the isopropanol. The product is then hot pressed in a graphite mold (with a minimum exposure to air) to a temperature of at least 1950° C. and a pressure of at least 2000 p.s.i. maximum pressure and temperature being maintained for at least one minute. The hot pressing is preferably carried out in an atmosphere of argon. The product resulting from this practice of the invention has a density in excess of 99% of theoretical density.

DETAILED PRACTICE OF INVENTION

In order that the invention may be more readily understood, one preferred method of practicing the invention is set forth in the following nonlimiting example:

EXAMPLE I

The hot pressed SiC produced here started with "3 micron" alpha SiC powder. The SiC powder used was a commercial Norton powder having an average particle size of 4.5 microns (as determined by micromerograph) with a boron content of less than 50 p.p.m., aluminum content of less than 0.1% and an iron content of .1%. The aluminum powder used was Reynolds "400" Atomized aluminum powder and is commercially available. The two powders were blended together by ball milling in tungsten carbide mills using tungsten carbide balls. The mill used in this example was a one quart size. The charge size was 200 gms. of "3 micron" silicon carbide plus 6 grams of aluminum. The mill was filled to half its volume by WC balls approximately ½" in diameter. To the charge was added 400 ml. of isopropanol. The material was ball milled for 31 hours at 120 r.p.m. After milling, the material was unloaded from the mill and placed in an oven for 12 hours at 80° C. to remove the isopropanol. The dried powder was then passed through a 40 mesh screen. This procedure produced a fine, well blended powder which could now be hot pressed.

The dies used in the hot pressing were made of graphite with graphite plungers. The cavity of the die produced a 3.5" diameter x ½" thick shape. The inside of the die, as well as the contact surfaces (inside ends) of the plungers, were coated with boron nitride.

The hot pressing operation is carried out in an induction heated furnace (graphite) using argon gas as a purge. The furnace is mounted on a 75-ton hydraulic press. As the temperature is increased from room temperature to approximately 1400° C., the pressure is increased from 100 p.s.i. to approximately 2700 p.s.i. From 1400° C. to 2075° C. the pressure is maintained at a constant 2700 p.s.i. The furnace is held at 2075° C. for 2 minutes. The furnace is allowed to cool to room temperature while the die remains under full pressure of 2700 p.s.i.

The resultant piece had a density of 3.627 gm./cc. Test bars (⅛ x ⅛ x 3 inch) were machined from the piece and tested on an Instron test rig (.02"/minute cross head speed). Room temperature cross bending values on ⅛ inch x ⅛ inch cross-section averaged 130,270 p.s.i. with a standard deviation of 11,186 p.s.i. for a .75 inch span.

As mentioned above, the flexural strength for the product of the present invention is directly related to the milling time during which the aluminum powder and silicon carbide are mixed in the WC mill. The density of the product is also directly related to milling time but the increase in density is primarily due to increase in the WC content of the product.

In Table I below there are tabulated the results from a number of different runs which were identical to the procedure of Example I, except for the milling time and size of mill. The small mill was one quart and the large mill was one gallon. In this table, the flexural strengths are averages over a number of runs.

strength. The exact role of the aluminum is not completely understood but it appears to be almost completely diffused into the crystal lattice since X-ray diffraction techniques fail to disclose the presence of appreciable quantities of a separate aluminum-bearing phase in the final product. Examination of a fracture surface of the product by a scanning electron microscope at a magnification at 25,000 times and by electron probe analysis of a magnification of 5000 times failed to detect any phase other than SiC and WC. There appears to be no appreciable concentration of aluminum oxide, aluminum carbide, or aluminum silicide as a separate phase. While some trace indications of aluminum compounds do exist, there are nowhere near enough to account for the amount of the aluminum added to the product and still existing (e.g. 2%) in the product as determined by chemical or spectrographic analysis.

While the tungsten carbide may be beneficial, it is not believed to be essential since the volume percent of WC varies over a substantial range and has only a minor effect on strength, as seen in Table I.

In the above discussion of the invention, a specific embodiment has been detailed involving the use of aluminum powder. While this is preferred, other aluminous materials such as aluminum halides, which are less stable than aluminum oxide, can be employed. The principal requirements for these other aluminous materials are that they are reducible to the very fine particle size during the milling to provide an extremely intimate mixture with the silicon carbide and that they be sufficiently unstable at the hot pressing temperature and pressure so that atomic aluminum is provided for diffusion into the silicon carbide crystal lattice While an upper limit of approximately 60 hours has been mentioned above in connection with the milling time, this is not critical. There are several factors which should be considered in determining the time for stopping the milling. One is obviously process cost; but more important is the particle size of the aluminum powder. While

TABLE 1

| Time, hours | Flexural strength (000s p.s.i.) °C. | | | | Density | | Volume percent WC | Mill |
|---|---|---|---|---|---|---|---|---|
| | 20 | 1,200 | 1,375 | 1,500 | G./cc. | Percent other | | |
| 1 | 84 | 56 | 50 | | 3.228 | | 0 | Small. |
| 5 | 90 | 64 | 54 | | 3.229 | | .25 | Large. |
| 5 | 90 | 63 | 52 | | 3.333 | | 1.1 | Small. |
| 15 | 106 | 78 | 59 | | 3.474 | | 2.3 | Do. |
| 20 | 110 | 82 | 62 | 46 | 3.600 | | 3.5 | Do. |
| 31 | 130 | 88 | 67 | | 3.627 | | 3.6 | Do. |
| 32 | 117 | 75 | 63 | | 3.314 | | .95 | Large. |

In the above discussion of the invention, the preferred embodiment contemplates the use of fine aluminum powder which is milled with the silicon carbide powder for a considerable period of time, preferably in excess of 15 hours. As pointed out above, the strength of the hot pressed product increases directly with the milling time. It is believed that this is the result of the continual reduction in size of the aluminum particles during the wet milling. It is believed these aluminum particles are reduced to a size of less than 0.1 micron as a result of the milling and that most of the aluminum particles are smeared onto the surface of the silicon carbide. Even if these aluminum particles are examined under a scanning electron microscope at a magnification of 25,000 times after only five hours of milling, the aluminum powder apparently has been smeared sufficiently so that individual aluminum particles cannot be identified.

When the mixture of the silicon carbide and very fine aluminum is heated under pressure to a temperature on the order of 2000° C., it is believed that the aluminum enters into the silicon carbide crystal lattice by a diffusion mechanism. As a result of this diffusion into the surface of the crystal, there is a change in the surface energy of the SiC crystal with resultant promotion of crystal to crystal bond which gives the product its remarkably high the smallest possible particle size is desirable from the standpoint of uniformity of dispersion with the SiC powder, there is the practical problem of the enormously increased reactivity of the powder as a function of the reduction in particle size. Accordingly, the milling must be stopped before the aluminum powder is reduced in size to the point where it becomes reactive with the "inert" isopropanol.

Similarly the aluminum powder should not be so small that the surface oxide, which will inevitably form during subsequent processing, will convert a substantial portion of the powder to the oxide.

In the specification and claims, the expressions "percent" and "%" mean weight percent, except where otherwise indicated.

While the invention has been described above in connection with the preferred example wherein aluminum powder is added to silicon carbide powder and milled in a tungsten carbide lined mill, the same result can be achieved by adding silicon carbide powder alone to an aluminum lined mill containing aluminum balls or rods. In this latter case, the abrasive silicon carbide grains remove enough aluminum from the mill and rods to incorporate between .5% and 5% of aluminum dispersed throughout the milled product. On hot pressing, this milled product will provide the same type of dense, high strength product described previously.

What is claimed is:

1. A dense, homogeneous, hot pressed silicon carbide body having a flexural strength above 100,000 p.s.i. to about an average of 130,270 p.s.i. with a standard deviation of 11,186 p.s.i. for a .75 inch span at room temperature, said body while having an average grain size between about 1 and 5 microns, the silicon carbide consisting essentially of alpha silicon carbide, the product containing between about .5 and 5% aluminum uniformly dispersed throughout the silicon carbide, essentially all of said aluminum being undetectable as a separate phase by X-ray detection techniques, said body being substantially free of any second phase (other than WC) which is detectable by a scanning electron microscope image of a fracture surface at a magnification of 25,000 times or an electron microprobe analysis of a fracture surface at a magnification of 5000 times.

References Cited

UNITED STATES PATENTS

| 3,532,493 | 10/1970 | Chay | 75—204 |
| 3,249,407 | 5/1966 | Alexander et al. | 75—204 |
| 3,178,807 | 4/1965 | Bergmann | 75—203 |
| 3,521,825 | 7/1970 | Morcom | 241—26 |
| 3,520,656 | 7/1970 | Meadows et al. | 423—345 |

OTHER REFERENCES

Alliegro et al.: "Pressure Sintered Sic," Journal of the American Ceramic Society, Vol. 39, No. 11, pp. 386–389, November 1956.

OSCAR R. VERTIZ, Primary Examiner

B. E. HEARN, Assistant Examiner

U.S. Cl. X.R.

29—182.7